United States Patent
Abedini et al.

(10) Patent No.: US 11,848,741 B2
(45) Date of Patent: Dec. 19, 2023

(54) BEAM MANAGEMENT OF A LAYER-1 MILLIMETER WAVE REPEATER USING WIDEBAND SIGNAL

(71) Applicant: QUALCOMM Incorporated, San Diego, CA (US)

(72) Inventors: Navid Abedini, Basking Ridge, NJ (US); Raju Hormis, New York, NY (US); Junyi Li, Fairless Hills, PA (US); Juergen Cezanne, Ocean Township, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/938,723

(22) Filed: Oct. 7, 2022

(65) Prior Publication Data
US 2023/0038533 A1   Feb. 9, 2023

Related U.S. Application Data

(62) Division of application No. 16/795,169, filed on Feb. 19, 2020, now Pat. No. 11,469,814.

(60) Provisional application No. 62/812,070, filed on Feb. 28, 2019.

(51) Int. Cl.
| | | |
|---|---|---|
| H04B 7/155 | (2006.01) | |
| H04W 52/46 | (2009.01) | |
| H04W 72/04 | (2023.01) | |
| H04W 72/044 | (2023.01) | |
| H04W 72/542 | (2023.01) | |

(52) U.S. Cl.
CPC ....... *H04B 7/15542* (2013.01); *H04B 7/1555* (2013.01); *H04W 52/46* (2013.01); *H04W 72/044* (2013.01); *H04W 72/542* (2023.01)

(58) Field of Classification Search
CPC ............ H04B 7/15542; H04B 7/1555; H04W 72/542; H04W 52/46; H04W 72/044
See application file for complete search history.

(56) References Cited

U.S. PATENT DOCUMENTS

| | | | |
|---|---|---|---|
| 6,560,463 | B1 | 5/2003 | Santhoff |
| 8,432,835 | B1 | 4/2013 | Dirks et al. |
| 11,469,814 | B2 | 10/2022 | Abedini et al. |
| 2005/0174960 | A1 | 8/2005 | Perlman |
| 2005/0190097 | A1 | 9/2005 | Hsu |
| 2008/0181283 | A1 | 7/2008 | Elhanati et al. |

(Continued)

OTHER PUBLICATIONS

International Search Report and Written Opinion—PCT/US2020/018994—ISA/EPO—dated Jun. 4, 2020.
U.S. Appl. No. 62/848,929, filed May 16, 2019.

*Primary Examiner* — Dominic E Rego
(74) *Attorney, Agent, or Firm* — Harrity & Harrity, LLP/QUALCOMM Incorporated

(57) ABSTRACT

Various aspects of the present disclosure generally relate to wireless communication. In some aspects, a repeater may transmit, via a first interface, information associated with a capability of the repeater to provide a wideband signal on a second interface. The repeater may receive via the first interface, a configuration for transmitting the wideband signal on the second interface, and may transmit the wideband signal on the second interface based at least in part on the configuration. Numerous other aspects are provided.

30 Claims, 11 Drawing Sheets

(56) References Cited

U.S. PATENT DOCUMENTS

| | | |
|---|---|---|
| 2008/0263146 A1 | 10/2008 | Habuto et al. |
| 2011/0117907 A1 | 5/2011 | Hooli et al. |
| 2012/0026907 A1 | 2/2012 | Goto et al. |
| 2012/0314609 A1 | 12/2012 | Chang et al. |
| 2014/0307654 A1 | 10/2014 | Kim |
| 2016/0014445 A1 | 1/2016 | Belz et al. |
| 2016/0291671 A1 | 10/2016 | Rider et al. |
| 2017/0105223 A1 | 4/2017 | Zhang et al. |
| 2017/0196044 A1 | 7/2017 | Nord |
| 2018/0176869 A1 | 6/2018 | Aryafar et al. |
| 2018/0206139 A1 | 7/2018 | Wang et al. |
| 2018/0249461 A1 | 8/2018 | Miao et al. |
| 2018/0316379 A1 | 11/2018 | Chang et al. |
| 2018/0375563 A1 | 12/2018 | Sun |
| 2019/0059098 A1 | 2/2019 | Zhang et al. |
| 2019/0132066 A1 | 5/2019 | Park et al. |
| 2019/0182093 A1 | 6/2019 | Jayawardene et al. |
| 2019/0281052 A1 | 9/2019 | Lekkas |
| 2019/0313427 A1 * | 10/2019 | Chen .................... H04L 5/0053 |
| 2019/0391194 A1 | 12/2019 | Gallhauser et al. |
| 2020/0145068 A1 | 5/2020 | Chendamarai Kannan et al. |
| 2020/0195310 A1 | 6/2020 | Abedini et al. |
| 2020/0280127 A1 | 9/2020 | Hormis et al. |
| 2020/0280355 A1 | 9/2020 | Abedini et al. |
| 2020/0280887 A1 | 9/2020 | Abedini et al. |
| 2020/0314663 A1 | 10/2020 | Wang et al. |
| 2020/0366363 A1 | 11/2020 | Li |

* cited by examiner

BEAM MANAGEMENT OF A LAYER-1 MILLIMETER WAVE REPEATER USING WIDEBAND SIGNAL

CROSS-REFERENCE TO RELATED APPLICATIONS

This Patent Application is a divisional of U.S. patent application Ser. No. 16/795,169, filed on Feb. 19, 2020, entitled "BEAM MANAGEMENT OF A LAYER-1 MILLIMETER WAVE REPEATER USING WIDEBAND SIGNAL," which claims priority to Provisional Patent Application No. 62/812,070, filed on Feb. 28, 2019, entitled "BEAM MANAGEMENT OF A LAYER-1 MILLIMETER WAVE REPEATER USING WIDEBAND BEACON," and assigned to the assignee hereof. The disclosure of the prior Applications is considered part of and is incorporated by reference in this Patent Application.

INTRODUCTION

Aspects of the present disclosure generally relate to wireless communication, and more particularly to beam management of a millimeter wave repeater.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements may be applicable to other multiple access technologies and the telecommunication standards that employ these technologies.

SUMMARY

In some aspects, a method of wireless communication, performed by a repeater, may include transmitting, via a first interface, information associated with a capability of the repeater to provide a wideband signal on a second interface; receiving, via the first interface, a configuration for transmitting the wideband signal on the second interface; and transmitting the wideband signal on the second interface based at least in part on the configuration.

In some aspects, a repeater for wireless communication may include memory and one or more processors coupled to the memory. The memory and the one or more processors may be configured to transmit, via a first interface, information associated with a capability of the repeater to provide a wideband signal on a second interface; receive, via the first interface, a configuration for transmitting the wideband signal on the second interface; and transmit the wideband signal on the second interface based at least in part on the configuration.

In some aspects, a non-transitory computer-readable medium may store one or more instructions for wireless communication. The one or more instructions, when executed by one or more processors of a repeater, may cause the one or more processors to: transmit, via a first interface, information associated with a capability of the repeater to provide a wideband signal on a second interface; receive, via the first interface, a configuration for transmitting the wideband signal on the second interface; and transmit the wideband signal on the second interface based at least in part on the configuration.

In some aspects, an apparatus for wireless communication may include means for transmitting, via a first interface, information associated with a capability of the apparatus to provide a wideband signal on a second interface; means for receiving, via the first interface, a configuration for transmitting the wideband signal on the second interface; and means for transmitting the wideband signal on the second interface based at least in part on the configuration.

In some aspects, a method of wireless communication, performed by a base station, may include receiving, via a first interface, information associated with a capability of a repeater to provide a wideband signal for transmission via a second interface; determining a configuration for transmitting the wideband signal on the second interface based at least in part on the information associated with the capability of the repeater; and transmitting, via the first interface, the configuration for transmitting the wideband signal on the second interface.

In some aspects, a base station for wireless communication may include memory and one or more processors coupled to the memory. The memory and the one or more processors may be configured to receive, via a first interface, information associated with a capability of a repeater to provide a wideband signal for transmission via a second interface; determine a configuration for transmitting the wideband signal on the second interface based at least in part on the information associated with the capability of the repeater; and transmit, via the first interface, the configuration for transmitting the wideband signal on the second interface.

In some aspects, a non-transitory computer-readable medium may store one or more instructions for wireless communication. The one or more instructions, when executed by one or more processors of a base station, may cause the one or more processors to: receive, via a first interface, information associated with a capability of a repeater to provide a wideband signal for transmission via a second interface; determine a configuration for transmitting the wideband signal on the second interface based at least in part on the information associated with the capability of the repeater; and transmit, via the first interface, the configuration for transmitting the wideband signal on the second interface.

In some aspects, an apparatus for wireless communication may include means for receiving, via a first interface, information associated with a capability of a repeater to provide a wideband signal for transmission via a second interface; means for determining a configuration for transmitting the wideband signal on the second interface based at least in part on the information associated with the capability of the repeater; and means for transmitting, via the first interface, the configuration for transmitting the wideband signal on the second interface.

In some aspects, a method of wireless communication, performed by a wireless node, may include receiving a measurement configuration associated with measuring a power metric on a set of resources associated with a wideband signal transmitted by a repeater; measuring, based at least in part on the measurement configuration, the power metric on the set of resources associated with the wideband signal transmitted by the repeater; and communicating with another wireless node based at least in part on a result of measuring the power metric on the set of resources.

In some aspects, a wireless node for wireless communication may include memory and one or more processors coupled to the memory. The memory and the one or more processors may be configured to receive a measurement configuration associated with measuring a power metric on a set of resources associated with a wideband signal transmitted by a repeater; measure, based at least in part on the measurement configuration, the power metric on the set of resources associated with the wideband signal transmitted by the repeater; and communicate with another wireless node based at least in part on a result of measuring the power metric on the set of resources.

In some aspects, a non-transitory computer-readable medium may store one or more instructions for wireless communication. The one or more instructions, when executed by one or more processors of a wireless node, may cause the one or more processors to: receive a measurement configuration associated with measuring a power metric on a set of resources associated with a wideband signal transmitted by a repeater; measure, based at least in part on the measurement configuration, the power metric on the set of resources associated with the wideband signal transmitted by the repeater; and communicate with another wireless node based at least in part on a result of measuring the power metric on the set of resources.

In some aspects, an apparatus for wireless communication may include means for receiving a measurement configuration associated with measuring a power metric on a set of resources associated with a wideband signal transmitted by a repeater; means for measuring, based at least in part on the measurement configuration, the power metric on the set of resources associated with the wideband signal transmitted by the repeater; and means for communicating with another wireless node based at least in part on a result of measuring the power metric on the set of resources.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
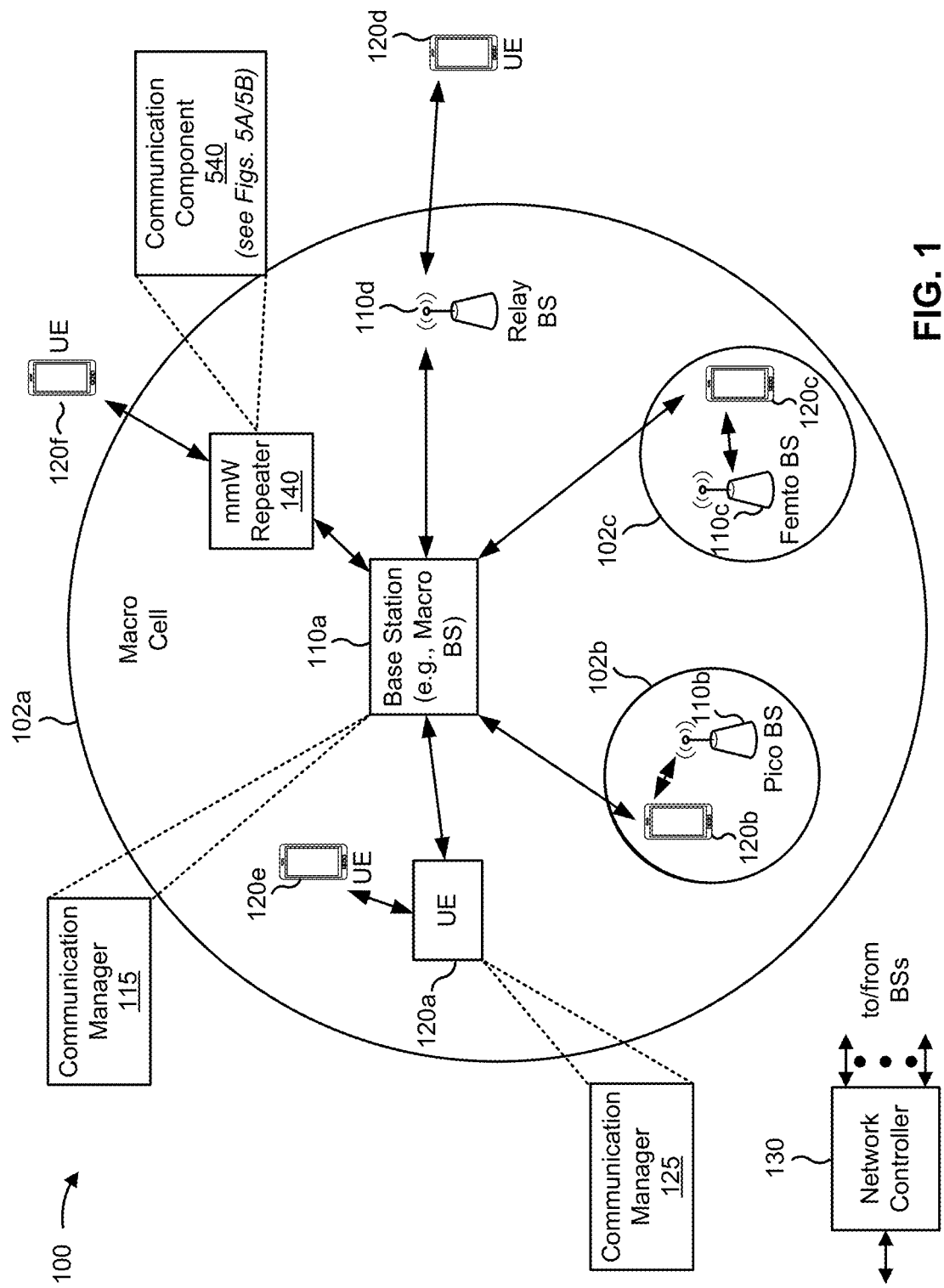
FIG. 1 is a block diagram conceptually illustrating an example of a wireless communication network, in accordance with various aspects of the present disclosure.

A mmW repeater may include components that enable receiving a signal on an RX antenna associated with a high frequency (HF) interface (e.g., a mmW interface), amplifying the power of the signal using a gain component, and transmitting the amplified signal on a TX antenna associated with the HF interface. These operations may be orchestrated and/or controlled by a controller. In some aspects, the mmW repeater may include a communication component that enables communication via a low frequency (LF) interface (e.g., an interface that uses a sub-6 gigahertz (GHz) frequency) for transmission or reception of information associated with such control signals (e.g., to or from one or more base stations).

A mmW repeater has the capability to only receive and forward a signal via an HF interface of the mmW repeater. These mmW repeaters are not capable of generating a signal and transmitting the signal via an HF interface, or of processing a signal received via the HF interface. However, access procedures and beam management procedures may be complicated by use of the mmW repeater. For example, in the case of beam management between a base station and a mmW repeater, the mmW repeater may not be able to process or measure a downlink reference signal (e.g., a synchronization signal block, a channel state information reference signal, and/or the like) in association with identifying a suitable beam pair link for a connection between the base station and the mmW repeater. As another example, in the case of beam management between a base station and a mmW repeater, the mmW repeater may not be able to provide (e.g., generate and transmit) an uplink reference signal (e.g., a sounding reference signal) in association with allowing the base station to identify a suitable beam pair link for a connection between the base station and the mmW repeater.

As another example, in the case of beam management between the mmW repeater and a UE, the mmW repeater may be able to receive a signal (e.g., on the uplink or the downlink) and forward the signal, but may not be able to identify a suitable beam pair link for a connection with the UE. As a result, overhead at the transmitter may be increased (e.g., since the suitable beam pair link may not be in use). Similarly, finding a suitable beam pair link for a connection with the base station (when there are multiple repeaters and/or multiple base stations), or a suitable beam pair link for a connection with a UE (when there are multiple repeaters) may be complicated due to the limited capabilities of the mmW repeater.

However, if a mmW repeater had the capability to generate a wideband analog signal (herein referred to as a wideband signal) and transmit the wideband signal via an HF interface, the above-described issues may be avoided. For example, in a case where the mmW repeater has the capability to generate and transmit a wideband signal via an HF interface, an access procedure and/or a beam management procedure may be simplified (e.g., as compared to using a mmW repeater).

For example, the mmW repeater may be instructed to transmit one or more wideband signals (e.g., with one or multiple different TX beam beamforming configurations) on a given set of time-domain resources. One or more wireless nodes (e.g., one or more base stations and/or UEs) may measure a received power (e.g., a received signal strength indicator (RSSI)) on the corresponding time-domain resources. Then, based at least in part on the received power, a given wireless node can determine a suitable TX beam beamforming configuration and/or a suitable RX beam beamforming configuration for a beam pair link with the mmW repeater (e.g., based at least in part on comparing received powers to one another, or comparing a received power to a threshold).

Further, based at least in part on the received power, the wireless node can then select a suitable node-pair candidate by, for example, incorporating measurements from multiple nodes (e.g., when measurements are reported among wireless nodes). As a particular example, a base station can identify a suitable set of one or more mmW repeaters (when there are multiple mmW repeaters) with which to communicate. As another particular example, a suitable base station for a given mmW repeater can be selected (when there are multiple base stations). As another particular example, a suitable set of one or more mmW repeaters can be selected for a given UE (when there are multiple mmW repeaters).

As used herein, the term "suitable" is defined as having a characteristic that satisfies a quality requirement. The quality requirement may include, for example, a threshold (e.g., a threshold reliability, a threshold signal strength, a threshold latency, a threshold, and/or the like). The term suitable can be used interchangeably with the term "acceptable," "satisfactory," "sufficient," or another similar term.

However, in order to support such functionality in association with simplifying access and/or beam management procedures, generation and transmission of wideband signals, as well as reporting of measurements of the wideband signals, needs to be coordinated. Some aspects described herein provide techniques and apparatuses associated with generating and transmitting a wideband signal by a mmW repeater.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network, a 5G or NR network, and/or the like. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*, 120*d*, 120*e*, 120*f*, and/or the like) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, millimeter wave (mmW) repeater 140 (sometimes referred to herein as a repeater 140) may receive an analog millimeter wave signal from a base station 110, may amplify the analog millimeter wave signal, and may transmit the amplified millimeter wave signal to one or more UEs 120 (e.g., shown as UE 120f). In some aspects, the mmW repeater 140 may be an analog mmW repeater, sometimes also referred to as a layer-1 mmW repeater. Additionally, or alternatively, mmW repeater 140 may be a wireless transmit receive point (TRP) acting as a distributed unit (e.g., of a 5G access node) that communicates wirelessly with a base station 110 acting as a central unit or an access node controller (e.g., of the 5G access node). The mmW repeater may receive, amplify, and transmit the analog mmW signal without performing analog-to-digital conversion of the analog mmW signal and/or without performing any digital signal processing on the mmW signal. In this way, latency may be reduced and a cost to produce the mmW repeater 140 may be reduced. Additional details regarding mmW repeater 140 are provided elsewhere herein.

As shown in FIG. 1, the base station 110 may include a communication manager 115. As described in more detail elsewhere herein, the communication manager 115 may include means for receiving, via a first interface (e.g., an LF interface) of mmW repeater 140, information associated with a capability of mmW repeater 140 to provide a wideband signal for transmission via a second interface (e.g., an HF interface) of mmW repeater 140; means for determining a configuration for transmitting the wideband signal on the second interface based at least in part on the information associated with the capability of mmW repeater 140; means for transmitting, via the first interface, the configuration for transmitting the wideband signal on the second interface. Additionally, or alternatively, the communication manager 115 may perform one or more other operations described herein. Additionally, or alternatively, as described in more detail elsewhere herein, the communication manager 115 may include means for receiving a measurement configuration associated with measuring a power metric on a set of resources associated with a wideband signal transmitted by mmW repeater 140; means for measuring, based at least in part on the measurement configuration, the power metric on the set of resources associated with the wideband signal transmitted by mmW repeater 140; and means for communicating with another wireless node based at least in part on a result of measuring the power metric on the set of resources.

As shown in FIG. 1, the UE 120 may include a communication manager 125. As described in more detail elsewhere herein, the communication manager 125 may include means for receiving a measurement configuration associated with measuring a power metric on a set of resources associated with a wideband signal transmitted by mmW repeater 140; means for measuring, based at least in part on the measurement configuration, the power metric on the set of resources associated with the wideband signal transmitted by mmW repeater 140; and means for communicating with another wireless node based at least in part on a result of measuring the power metric on the set of resources. Additionally, or alternatively, the communication manager 125 may perform one or more other operations described herein.

As indicated above, FIG. 1 is provided merely as an example. Other examples may differ from what is described with regard to FIG. 1.

Figure 2:
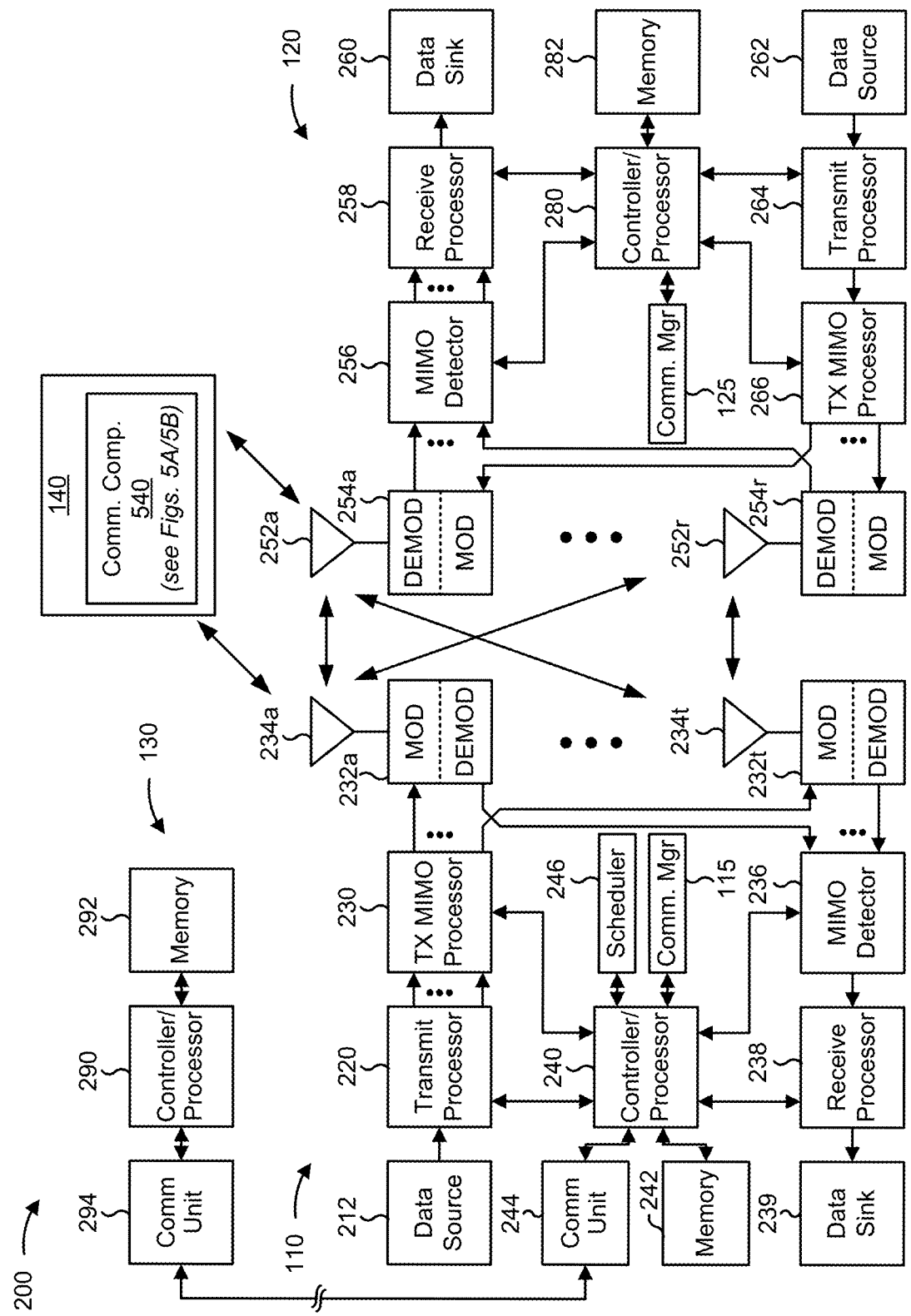
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110 and/or any other component(s) of FIG. 2 may perform one or more techniques associated with beam management of mmW repeater 140 using a wideband signal, as described in more detail elsewhere herein. For example, controller/processor 240 of base station 110 and/or any other component(s) of FIG. 2 may perform or direct operations of, for example, process 800 of FIG. 8, process 900 of FIG. 9, process 1000 of FIG. 10, and/or other processes as described herein. Memories 242 may store data and program codes for base station 110, respectively. A scheduler 246 may schedule UEs for data transmission on the downlink and/or uplink.

In some aspects, the base station 110 may include means for receiving, via a first interface of mmW repeater 140, information associated with a capability of mmW repeater 140 to provide a wideband signal for transmission via a second interface of mmW repeater 140; means for determining a configuration for transmitting the wideband signal on the second interface based at least in part on the information associated with the capability of mmW repeater 140; means for transmitting, via the first interface, the configuration for transmitting the wideband signal on the second interface; and/or the like. In some aspects, the base station 110 may include means for receiving a measurement configuration associated with measuring a power metric on a set of resources associated with a wideband signal transmitted by mmW repeater 140; means for measuring, based at least in part on the measurement configuration, the power metric on the set of resources associated with the wideband signal transmitted by mmW repeater 140; means for communicating with another wireless node based at least in part on a result of measuring the power metric on the set of resources; and/or the like. Additionally, or alternatively, the base station 110 may include means for performing one or more other operations described herein. In some aspects, such means may include the communication manager 115. In some aspects, such means may include one or more components of the base station 110 described in connection with FIG. 2.

In some aspects, the UE 120 may include means for receiving a measurement configuration associated with measuring a power metric on a set of resources associated with a wideband signal transmitted by mmW repeater 140; means for measuring, based at least in part on the measurement configuration, the power metric on the set of resources associated with the wideband signal transmitted by mmW repeater 140; means for communicating with another wireless node based at least in part on a result of measuring the power metric on the set of resources; and/or the like. Additionally, or alternatively, the UE 120 may include means for performing one or more other operations described herein. In some aspects, such means may include the communication manager 125. In some aspects, such means may include one or more components of the UE 120 described in connection with FIG. 2.

As indicated above, FIG. 2 is provided merely as an example. Other examples may differ from what is described with regard to FIG. 2.

Figure 3:
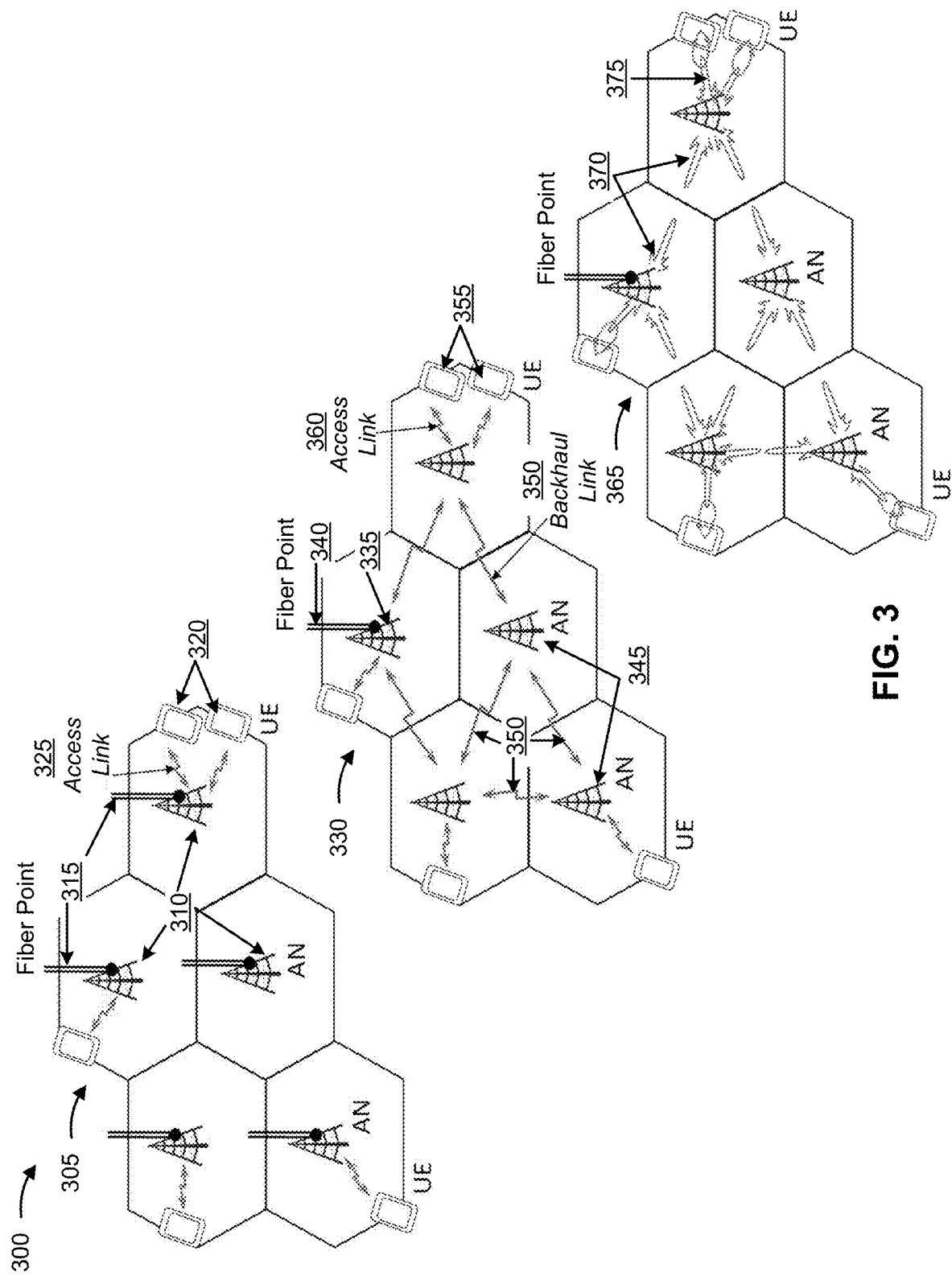
FIG. 3 is a diagram illustrating examples of radio access networks, in accordance with various aspects of the present disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly with or indirectly with (e.g., via one or more non-anchor base stations 345) the anchor base station 335 via one or more backhaul links 350 to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

In some aspects, an IAB network may support a multi-hop wireless backhaul. Additionally, or alternatively, nodes of an IAB network may use the same radio access technology (e.g., 5G/NR). Additionally, or alternatively, nodes of an IAB network may share resources for access links and backhaul links, such as time resources, frequency resources, spatial resources, and/or the like. Furthermore, various architectures of IAB nodes and/or IAB donors may be supported.

The configuration of base stations and UEs in FIG. 3 is shown as an example, and other examples are possible. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
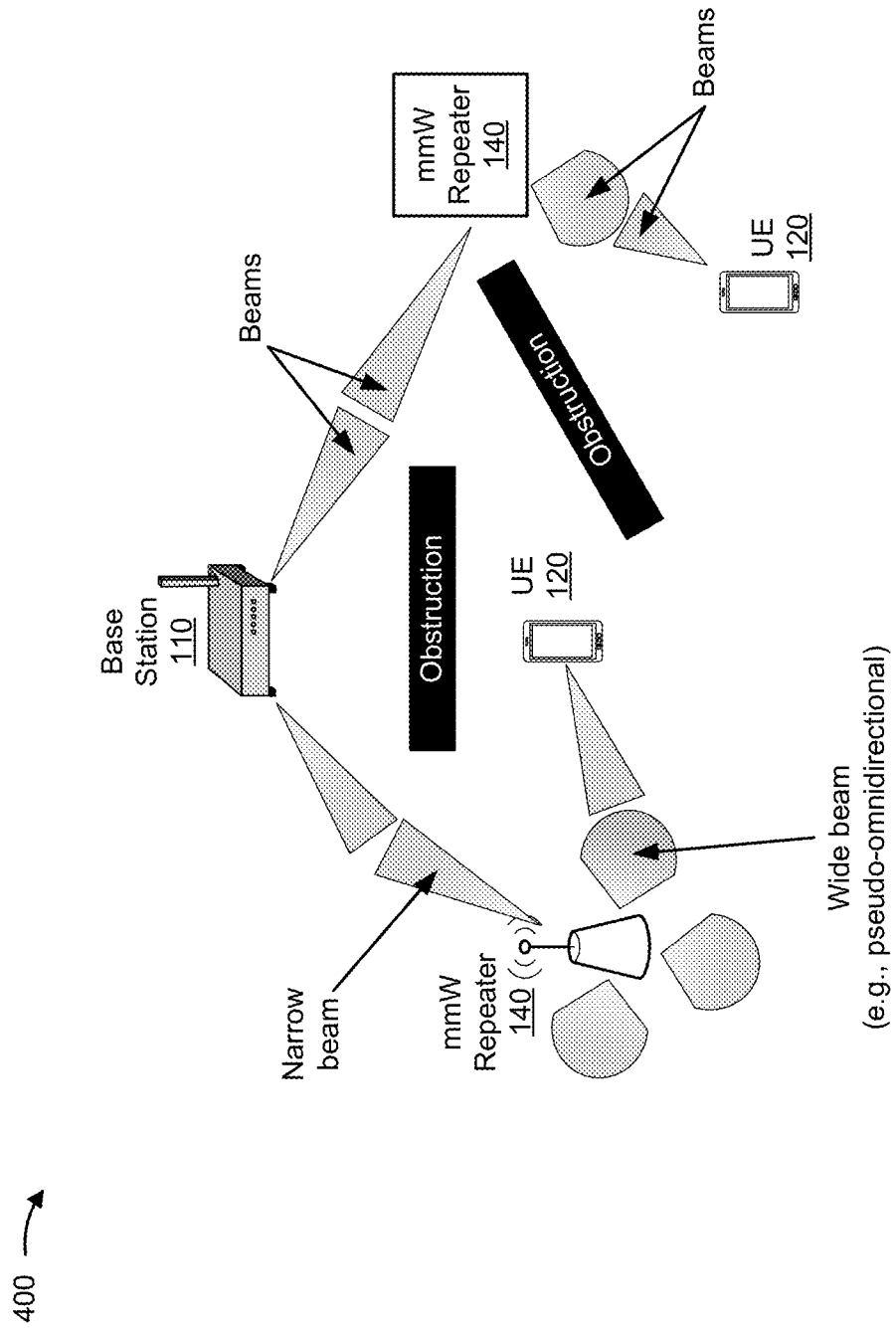
FIG. 4 is a diagram illustrating an example of communicating using a millimeter wave repeater, in accordance with various aspects of the present disclosure.

FIG. 4 is a diagram illustrating an example 400 of communicating using an analog millimeter wave repeater, in accordance with various aspects of the present disclosure.

Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station 110 that communicates using the sub-6 GHz radio waves. However, a millimeter wave may not be capable of penetrating the same wall (e.g., depending on a thickness of the wall, a material from which the wall is constructed, and/or the like). Some techniques and apparatuses described herein use a millimeter wave repeater 140 to increase the coverage area of a base station 110, to extend coverage to UEs 120 without line of sight to the base station 110 (e.g., due to an obstruction), and/or the like. Furthermore, the millimeter wave repeater 140 described herein may be a layer 1 or an analog millimeter wave repeater, which is associated with a lower cost, less processing, and lower latency than a layer 2 or layer 3 repeater.

As shown in FIG. 4, a millimeter wave repeater 140 may perform directional communication by using beamforming to communicate with a base station 110 via a first beam (e.g., a backhaul beam over a backhaul link with the base station 110) and to communicate with a UE 120 via a second beam (e.g., an access beam over an access link with the UE 120). To achieve long propagation distances and/or to satisfy a required link budget, the millimeter wave repeater may use narrow beams (e.g., with a beamwidth less than a threshold) for such communications.

However, using a narrower beam requires the use of more resources of the millimeter wave repeater 140 (e.g., processing resources, memory resources, power, battery power, and/or the like) and more network resources (e.g., time resources, frequency resources, spatial resources, and/or the like), as compared to a wider beam, to perform beam training (e.g., to determine the suitable beam), beam maintenance (e.g., to find the suitable beam as conditions change due to mobility and/or the like), beam management, and/or the like. This may waste resources of the millimeter wave repeater 140 and/or network resources as compared to using a wider beam, and may lead to increased cost of production of millimeter wave repeaters 140, which may be deployed extensively throughout a radio access network.

For example, a millimeter wave repeater 140 may be deployed in a fixed location with limited or no mobility, similar to a base station 110. As shown in FIG. 4, the millimeter wave repeater 140 may use a narrower beam to communicate with the base station 110 without unnecessarily consuming network resources and/or resources of the millimeter wave repeater 140 because the need for beam training, beam maintenance, and/or beam management may be limited, due to limited or no mobility of the base station 110 and the millimeter wave repeater 140 (and/or due to a line of sight communication path between the base station 110 and the millimeter wave repeater 140).

As further shown in FIG. 4, the millimeter wave repeater 140 may use a wider beam (e.g., a pseudo-omnidirectional beam and/or the like) to communicate with one or more UEs 120. This wider beam may provide wider coverage for access links, thereby providing coverage to mobile UEs 120 without requiring frequent beam training, beam maintenance, and/or beam management. In this way, network resources and/or resources of the millimeter wave repeater 140 may be conserved. Furthermore, if the millimeter wave repeater 140 does not include digital signal processing capabilities, resources of the base station 110 (e.g., processing resources, memory resources, and/or the like) may be conserved that would otherwise be used to perform such signal processing for the millimeter wave repeater 140, and network resources may be conserved that would otherwise be used to communicate input to or output of such processing between the base station 110 and the millimeter wave repeater 140.

In this way, the millimeter wave repeater 140 may increase a coverage area, provide access around obstructions (as shown), and/or the like, while conserving resources of the base station 110, resources of the millimeter wave repeater 140, network resources, and/or the like. Additional details are described below.

As indicated above, FIG. 4 is provided as an example. Other examples may differ from what is described with regard to FIG. 4.

Figure 5A:
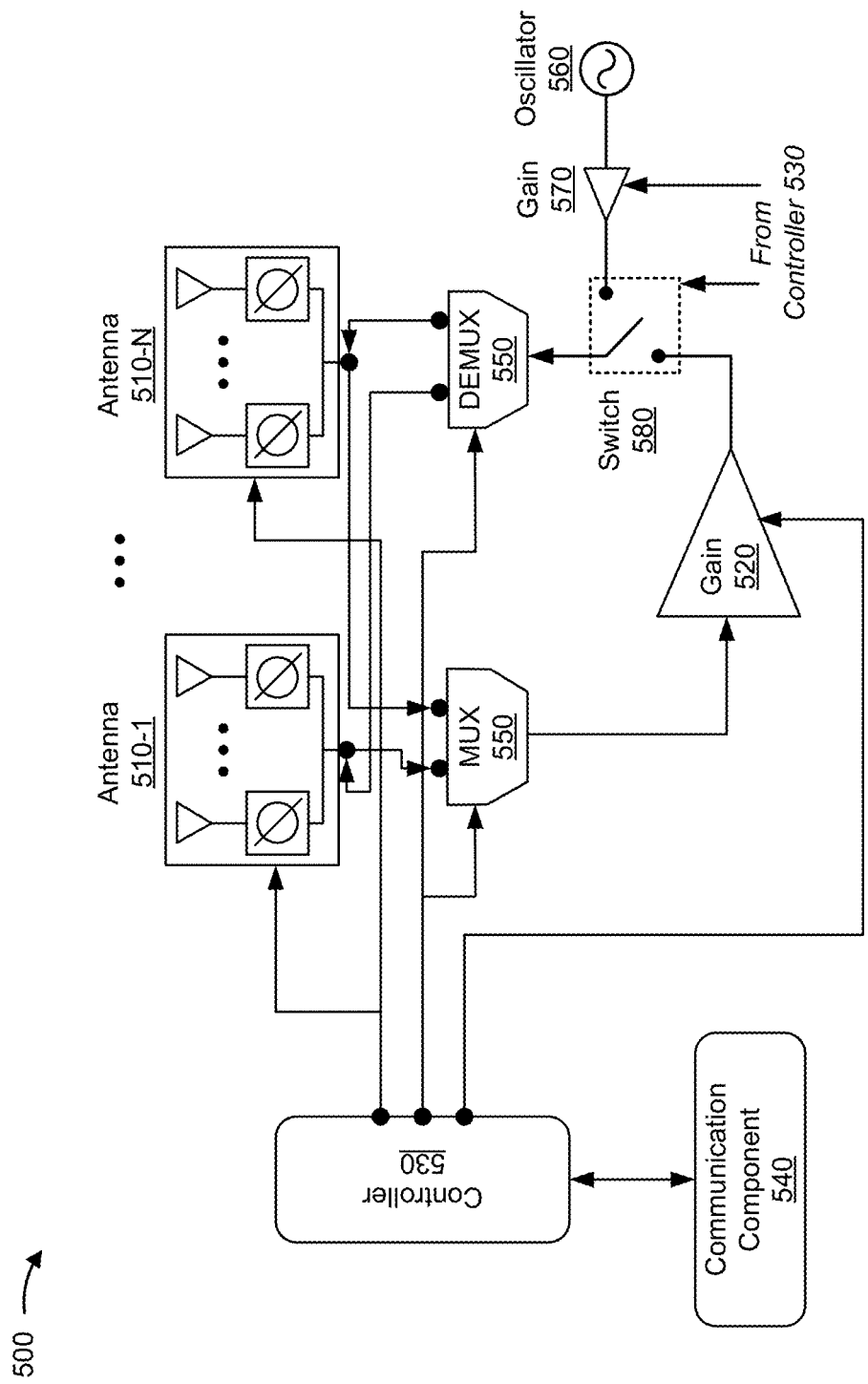
FIGS. 5A and 5B are diagrams illustrating example millimeter wave repeaters, in accordance with various aspects of the present disclosure.
Figure 5B:
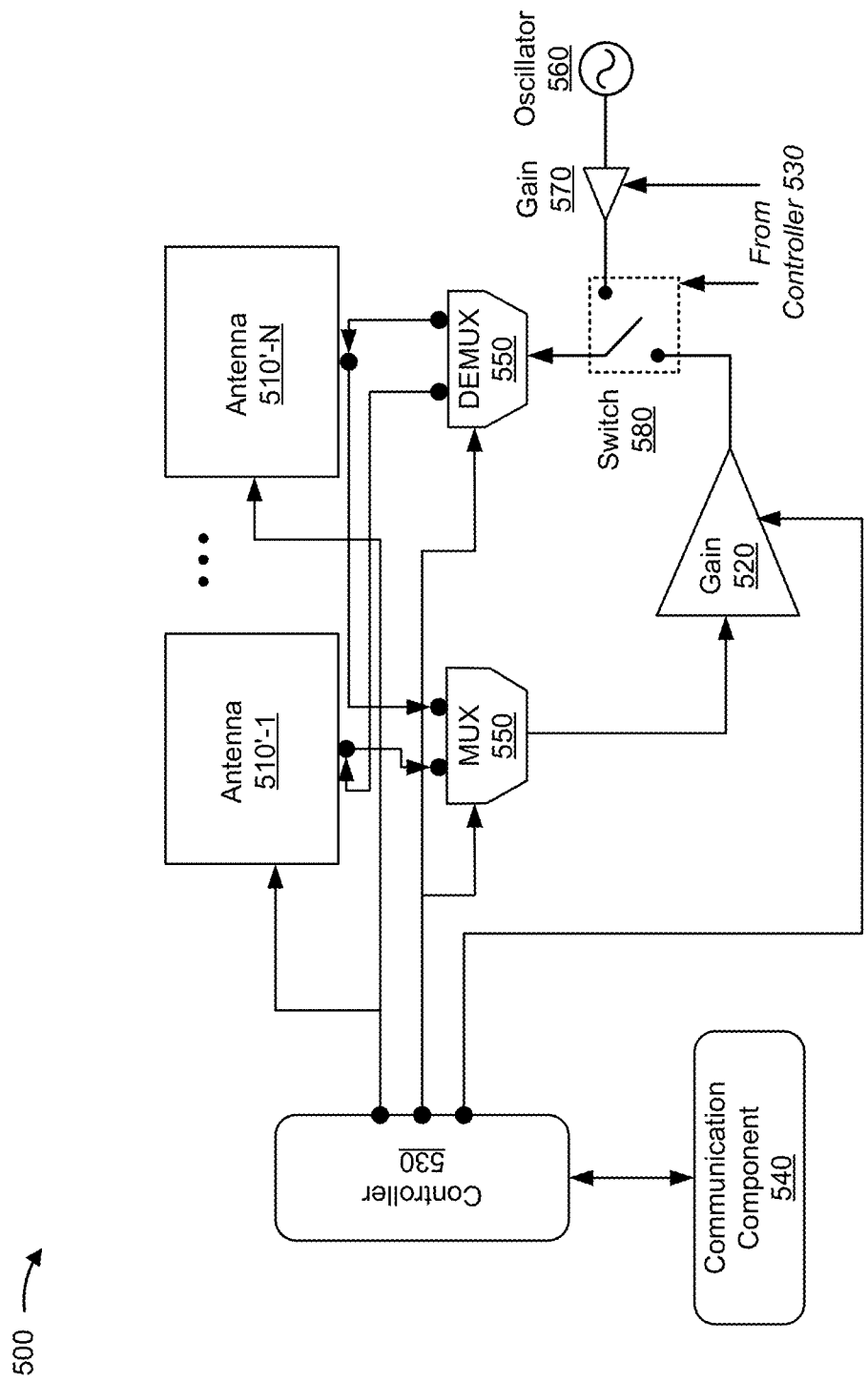

FIGS. 5A and 5B are diagrams illustrating examples of a millimeter wave repeater 500, in accordance with various aspects of the present disclosure. In some aspects, millimeter wave repeater 500 may correspond to millimeter wave repeater 140 shown in FIG. 1.

As shown in FIG. 5A, in some aspects, the millimeter wave repeater 500 may include one or more phased array antennas 510-1 through 510-N(N>1), a gain component 520, a controller 530, a communication component 540, and a multiplexer (MUX) and/or demultiplexer (DEMUX) (MUX/DEMUX) 550.

As shown in FIG. 5B, in some aspects, the millimeter wave repeater 500 may include one or more metamaterial antennas 510'-1 through 510'-N, gain component 520, controller 530, communication component 540, and one or more MUX/DEMUX 550.

An antenna 510/510' includes one or more antenna elements having the capability to be configured for beamforming. In some aspects, as illustrated in FIG. 5A, millimeter wave repeater 500 may include one or more phased array antennas 510, which may be referred to as a phased array because phase values and/or phase offsets of the antenna elements may be configured to form a beam, with different phase values and/or phase offsets being used for different beams (e.g., in different directions). In some aspects, as illustrated in FIG. 5B, millimeter wave repeater 500 may include one or more metamaterial antennas 510'. In some aspects, a metamaterial antenna may comprise a synthetic material with negative permittivity and/or permeability, which yields a negative refractive index. Due to the resulting superior antenna gain and electro-magnetic lensing, the metamaterial antenna may not need to be used in a phased-array configuration. However, if in phased-array configuration, antenna spacing could be less than a typically used spacing of lambda/2, where lambda refers to a wavelength of the RF carrier signal. In some aspects, due to superior beamforming, the metamaterial antenna may reduce leakage back to the RX antenna and may reduce a chance of instability in the RF chain. Hence, the use of metamaterial antennas may reduce or obviate a need for a feedback path.

In some aspects, an antenna 510/510' may be a fixed receive (RX) antenna having the capability to only receive communications, and not transmit communications. In some aspects, an antenna 510/510' may be a fixed transmit (TX) antenna having the capability to only transmit communications, and not receive communications. In some aspects, an antenna 510/510' may have the capability to be configured to act as an RX antenna or a TX antenna (e.g., via a TX/RX switch, a MUX/DEMUX, and/or the like). The antennas 510/510' may have the capability to communicate using millimeter waves.

Gain component 520 includes a component having the capability to amplify an input signal and output an amplified signal. For example, gain component 520 may include a power amplifier, a variable gain component, and/or the like. In some aspects, gain component 520 may have variable gain control. The gain component 520 may connect to an RX antenna (e.g., a first antenna 510/510'-1) and a TX antenna (e.g., a second antenna 510/510'-2) such that an analog millimeter wave signal, received via the RX antenna, can be amplified by the gain component 520 and output to the TX antenna for transmission. In some aspects, the level of amplification of the gain component 520 may be controlled by the controller 530.

Controller 530 includes a component having the capability to control one or more other components of the millimeter wave repeater 500. For example, the controller 530 may include a controller, a microcontroller, a processor, and/or the like. In some aspects, the controller 530 may control the gain component 520 by controlling a level of amplification or gain applied by the gain component 520 to an input signal. Additionally, or alternatively, the controller 530 may control an antenna 510/510' by controlling a beamforming configuration for the antenna 510/510' (e.g., one or more phase values for the antenna 510/510', one or more phase offsets for the antenna 510/510', one or more power parameters for the antenna 510/510', one or more beamforming parameters for the antenna 510/510', a TX beamforming configuration, an RX beamforming configuration, and/or the like), by controlling whether the antenna 510/510' acts as an RX antenna or a TX antenna (e.g., by configuring interaction and/or connections between the antenna 510/510' and a MUX/DEMUX 550), and/or the like. Additionally, or alternatively, the controller 530 may power on or power off one or more components of millimeter wave repeater 500 (e.g., when a base station 110 does not need to use the millimeter wave repeater to serve UEs 120). In some aspects, the controller 530 may control a timing of one or more of the above configurations. Additionally, or alternatively, the controller 530 may control a position of switch 580 in order to cause oscillator 560 to be connected to one or more antennas 510/510' (via gain component 570) in association with transmitting a wideband signal generated by millimeter wave repeater 500, as described herein. In some aspects, the controller 530 may control the gain component 570 by controlling a level of amplification or gain applied by the gain component 570 to a signal provided by oscillator 560.

Communication component 540 may include a component having the capability to wirelessly communicate with a base station 110 using a wireless technology other than millimeter wave. For example, the communication component 540 may communicate with the base station 110 using a personal area network (PAN) technology (e.g., Bluetooth, Bluetooth Low Energy (BLE), and/or the like), a 4G or LTE radio access technology, a narrowband Internet of Things (NB-IoT) technology, a sub-6 GHz technology, a visible light communication technology, and/the like. In some aspects, the communication component 540 may use a lower frequency communication technology, and an antenna 510/510' may use a higher frequency communication technology (e.g., millimeter wave and/or the like). In some aspects, an antenna 510/510' may be used to transfer data between the millimeter wave repeater 500 and the base station 110, and the communication component 540 may be used to transfer control information between the millimeter wave repeater 500 and the base station 110 (e.g., a report, a configuration, instructions to power on or power off one or more components, and/or the like).

MUX/DEMUX 550 may be used to multiplex and/or demultiplex communications received from and/or transmitted to an antenna 510/510'. For example, MUX/DEMUX 550 may be used to switch an RX antenna to a TX antenna.

Oscillator 560 may be used to generate a wideband analog signal (referred to herein as a wideband signal) for transmission by millimeter wave repeater 500 via an antenna 510/510' of an HF interface of millimeter wave repeater 500. In some aspects, the wideband signal may be used in association with beam management of millimeter wave repeater 500, as described elsewhere herein. In some aspects, since the wideband signal is not used for heterodyning or in association with transmitting information, oscillator 560 can be a low-cost oscillator (with poor phase noise). Thus, inclusion of oscillator 560 in millimeter wave repeater 500 may not significantly impact a cost of millimeter wave repeater 500.

Gain component 570 includes a component having the capability to amplify an input signal and output an amplified signal. For example, gain component 570 may include a power amplifier, a variable gain component, and/or the like. In some aspects, gain component 570 may have variable gain control. The gain component 570 may connect to oscillator 560 and a TX antenna (e.g., an antenna 510/510'-1) such that a wideband signal, provided by oscillator 560, can be amplified by the gain component 570 and output to the TX antenna for transmission. In some aspects, the level of amplification of the gain component 570 may be controlled by the controller 530.

Switch 580 includes a component having the capability to cause millimeter wave repeater 500 to operate either to relay a signal received via an RX antenna (e.g., an antenna 510/510') or to transmit a wideband signal generated by millimeter wave repeater 500 (e.g., an analog wideband signal generated by oscillator 560 and amplified by gain component 570). In some aspects, as indicated in FIGS. 5A and 5B, switch 580 may be a single pole dual throw (SPDT) switch. In some aspects, the position of switch 580 may be controlled by the controller 530.

In some aspects, the millimeter wave repeater 500 does not include any components for digital signal processing. For example, the millimeter wave repeater 500 may not include a digital signal processor, a baseband processor, a digital-to-analog converter (DAC), an analog-to-digital converter (ADC), and/or the like. In this way, a cost to produce the millimeter wave repeater 500 may be reduced. Furthermore, latency may be reduced by eliminating digital processing of received millimeter wave signals prior to transmission of corresponding amplified millimeter wave signals.

In some aspects, one or more antennas 510/510', gain component 520, controller 530, communication component 540, MUX/DEMUX 550, oscillator 560, gain component 570, switch 580, and/or the like may perform one or more operations associated with beam management of millimeter wave repeater 500 using a wideband signal, as described in more detail elsewhere herein. For example, one or more components of millimeter wave repeater 500 may perform or direct operations of, for example, process 800 of FIG. 8, process 900 of FIG. 9, process 1000 of FIG. 10, and/or other processes as described herein.

In some aspects, millimeter wave repeater 500 may include means for transmitting, via a first interface (e.g., an LF interface), information associated with a capability of millimeter wave repeater 500 to provide a wideband signal on a second interface (e.g., an HF interface); means for receiving, via the first interface, a configuration for transmitting the wideband signal on the second interface; means for transmitting the wideband signal on the second interface based at least in part on the configuration; and/or the like. In some aspects, millimeter wave repeater 500 may include means receiving a measurement configuration associated with measuring a power metric on a set of resources associated with a wideband signal transmitted by mmW repeater 140; means for measuring, based at least in part on the measurement configuration, the power metric on the set of resources associated with the wideband signal transmitted by mmW repeater 140; means for communicating with another wireless node based at least in part on a result of measuring the power metric on the set of resources; and/or the like. In some aspects, such means may include one or more components of millimeter wave repeater 500 described in connection with FIGS. 5A and 5B.

As indicated above, FIGS. 5A and 5B is provided as an example. d Other examples may differ from what is described with regard to FIGS. 5A and 5B. For example, millimeter wave repeater 500 may include additional components, fewer components, different components, or differently arranged components than those shown in FIGS. 5A and 5B. Furthermore, two or more components shown in FIGS. 5A and 5B may be implemented within a single component, or a single component shown in FIGS. 5A and 5B may be implemented as multiple components. Additionally, or alternatively, a set of components (e.g., one or more components) of millimeter wave repeater 500 may perform one or more functions described as being performed by another set of components of millimeter wave repeater 500.

A mmW repeater has the capability to only receiving and forwarding a signal via an HF interface of the mmW repeater. These mmW repeaters are not capable of generating a signal and transmitting the signal via an HF interface, or of processing a signal received via the HF interface. This lack of capabilities may complicate access procedures and beam management procedures associated with the mmW repeater. For example, in the case of beam management between a base station 110 and a mmW repeater, the mmW repeater is not able to process or measure a downlink reference signal (e.g., a synchronization signal block, a channel state information reference signal, and/or the like) in association with identifying a suitable beam pair link for a connection between base station 110 and the mmW repeater. As another example, in the case of beam management between a base station 110 and a mmW repeater, the mmW repeater is not able to provide an uplink reference signal (e.g., a sounding reference signal) in association with allowing the base station to identify a suitable beam pair link for a connection between base station 110 and the mmW repeater.

As another example, in the case of beam management between the mmW repeater and UE 120, the mmW repeater may be able to only receive a signal (e.g., on the uplink or the downlink) and forward the signal, but may not be able to identify a suitable beam pair link for a connection with UE 120. As a result, overhead at the transmitter may be increased (e.g., since the suitable beam pair link may not be in use). Similarly, finding a suitable beam pair link for a connection with base station 110 (when there are multiple repeaters and/or multiple base stations 110), or a suitable beam pair link for a connection with UE 120 (when there are multiple repeaters) may be complicated due to the limited capabilities of the mmW repeater.

However, if a mmW repeater had the capability to generate a wideband analog signal (herein referred to as a wideband signal) and transmit the wideband signal via an HF interface, the above-described issues may be avoided. For example, in a case where the mmW repeater has the capability to generate and transmit a wideband signal via an HF interface, an access procedure and/or a beam management procedure may be simplified. For example, mmW repeater 140 may be instructed to transmit one or more wideband signals (e.g., with one or multiple different TX beam beamforming configurations) on a given set of time-domain resources. Here, one or more wireless nodes (e.g., one or more base stations 110 and/or UEs 120) may measure a received power (e.g., a received signal strength indicator (RSSI)) on the corresponding time-domain resources. Here, based at least in part on the received power, a given wireless node can determine a suitable TX beam beamforming configuration and/or a suitable RX beam beamforming configuration for a beam pair link with mmW repeater 140 (e.g., based at least in part on comparing received powers to one another, or comparing a received power to a threshold).

Further, based at least in part on the received power, the wireless node can then select a suitable node-pair candidate by, for example, incorporating measurements from multiple nodes (e.g., when measurements are reported among wireless nodes). As a particular example, a base station 110 can identify a suitable set of one or more mmW repeaters 140 (when there are multiple mmW repeaters 140) with which to communicate. As another particular example, a suitable base station 110 for a given mmW repeater 140 can be selected (when there are multiple base stations 110). As another particular example, a suitable set of one or more mmW repeaters 140 can be selected for a given UE 120 (when there are multiple mmW repeaters 140).

However, in order to support such functionality in association with simplifying access and/or beam management procedures, generation and transmission of wideband signals, as well as reporting of measurements of the wideband signals, needs to be coordinated. Some aspects described herein provide techniques and apparatuses associated with generating and transmitting a wideband signal by mmW repeater 140.

Figure 6:
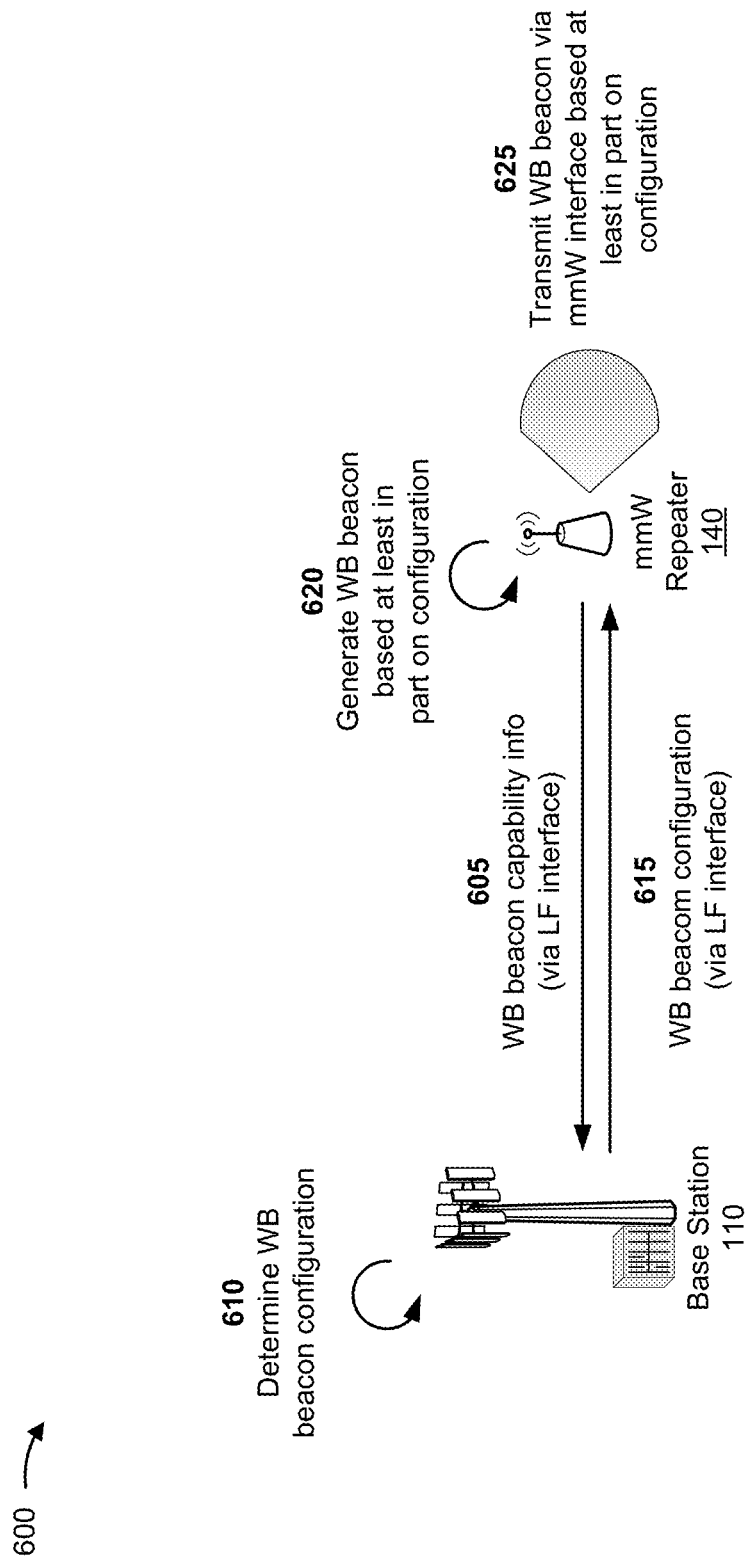
FIGS. 6 and 7 are diagrams illustrating examples associated with beam management of a millimeter wave repeater using a wideband signal, in accordance with various aspects of the present disclosure.

FIG. 6 is a diagram illustrating an example 600 associated with generation and transmission of a wideband signal by a mmW repeater 140, in accordance with various aspects of the present disclosure.

As shown in FIG. 6, and by reference number 605, mmW repeater 140 may transmit information associated with a capability of mmW repeater 140 to provide (e.g., generate and transmit) a wideband signal on an HF interface of mmW repeater 140. Such information is herein referred to as wideband capability information. In some aspects, mmW repeater 140 may transmit the wideband capability information via an LF interface of mmW repeater 140.

In some aspects, mmW repeater 140 may transmit the wideband capability information based at least in part on a request transmitted by base station 110. For example, base station 110 may transmit, to mmW repeater 140 and via an LF interface of base station 110, a request for the wideband capability information associated with mmW repeater 140. Here, mmW repeater 140 may receive the request via the LF interface of mmW repeater 140, and may transmit the wideband capability information based at least in part on receiving the request.

In some aspects, the wideband capability information associated with mmW repeater 140 includes an indication of whether mmW repeater 140 has the capability to generate and transmit a wideband signal. In other words, the wideband capability information may include an indication of whether mmW repeater 140 has an HF architecture having the capability to generate and transmit a wideband signal. In some aspects, when mmW repeater 140 has the capability to generate and transmit a wideband signal via an HF interface, the wideband capability information may include information indicating whether mmW repeater 140 has the capability to perform beam sweeping with a wideband signal, an indication of a power level or a range of power levels for the wideband signal, and/or another type of information relating to capabilities of mmW repeater 140 when generating or transmitting the wideband signal.

As further shown in FIG. 6, base station 110 may receive the wideband capability information and, as shown by reference number 610, may determine a configuration for transmitting the wideband signal on the HF interface. In some aspects, base station 110 may determine the configuration based at least in part on the wideband capability information associated with mmW repeater 140.

In some aspects, the configuration may include information indicating a manner in which mmW repeater 140 is to generate or transmit a wideband signal. For example, the configuration may include information associated with a TX beam beamforming configuration associated with transmitting the wideband signal (e.g., information indicating which TX beam and/or antenna 510/510' is to be used for transmission of the wideband signal, information indicating if the wideband is to be swept, and/or the like). As another example, the configuration may include information associated with a TX beam power setting associated with transmitting the wideband signal. As another example, the configuration may include information that identifies a set of time-domain resources on which the wideband signal is to be transmitted.

In some aspects, the configuration may indicate that mmW repeater 140 is to transmit the wideband signal on a periodic basis. Additionally, or alternatively, the configuration may indicate that mmW repeater 140 is to transmit the wideband signal on a semi-persistent basis (e.g., in a configured set of time-domain resources).

In some aspects, the configuration may indicate that mmW repeater 140 is to transmit the wideband signal in response to an occurrence of an event (i.e., such that the transmitting of the wideband signal is event-triggered). For example, the configuration may indicate, upon the occurrence of a particular event, mmW repeater 140 is to transmit a wideband signal on a configured set of time-domain resources. The triggering event may include, for example, a received power measurement by mmW repeater 140 that satisfies a threshold, the expiration of a timer, and/or another type of detectable event.

In some aspects, the configuration may be used to dynamically configure the transmitting of the wideband signal (e.g., such that the generation and transmission of the wideband signal can be dynamically configured by base station 110).

As further shown in FIG. 6, and by reference number 615, base station 110 may transmit, to mmW repeater 140, the configuration for transmitting the wideband signal on the HF interface. In some aspects, base station 110 may transmit the configuration via the LF interface. In some aspects, base station 110 may transmit the configuration to mmW repeater 140 in a control command via LF interfaces of base station 110 and mmW repeater 140. In some aspects, the control command may include other information, such as information associated with a configuration for the HF interface of mmW repeater 140.

As shown in FIG. 6, mmW repeater 140 may receive the configuration and, as shown by reference number 620, generate a wideband signal based at least in part on the configuration. As shown by reference number 625, mmW repeater 140 may transmit, via the HF interface of mmW repeater 140, the wideband signal based at least in part on configuration.

In some aspects, base station 110 may measure a power metric on resources in which mmW repeater 140 transmits the wideband signal on the HF interface. For example, mmW repeater 140 may provide the wideband signal in a configured set of time-domain resources accordance with the configuration, and base station 110 may measure a received power in the time-domain resources.

In some aspects, base station 110 may determine, based at least in part on a result of measuring the power metric, whether a connection can be established between base station 110 and mmW repeater 140 via the HF interface. Further, in some aspects, base station 110 may identify, based at least in part on a result of measuring the power metric, a beamforming configuration associated with establishing the connection between base station 110 and mmW repeater 140 via the HF interface. In this way, base station 110 may determine whether a connection can be established with mmW repeater 140 via the HF interface and, if so, which TX beam beamforming configuration and/or RX beam beamforming configuration to use for the connection.

As indicated above, FIG. 6 is provided as an example. Other examples may differ from what is described with respect to FIG. 6.

In some aspects, base station 110 may cause one or more other wireless nodes to measure the wideband signal and (optionally) report information associated with a measurement of the wideband signal.

Figure 7:
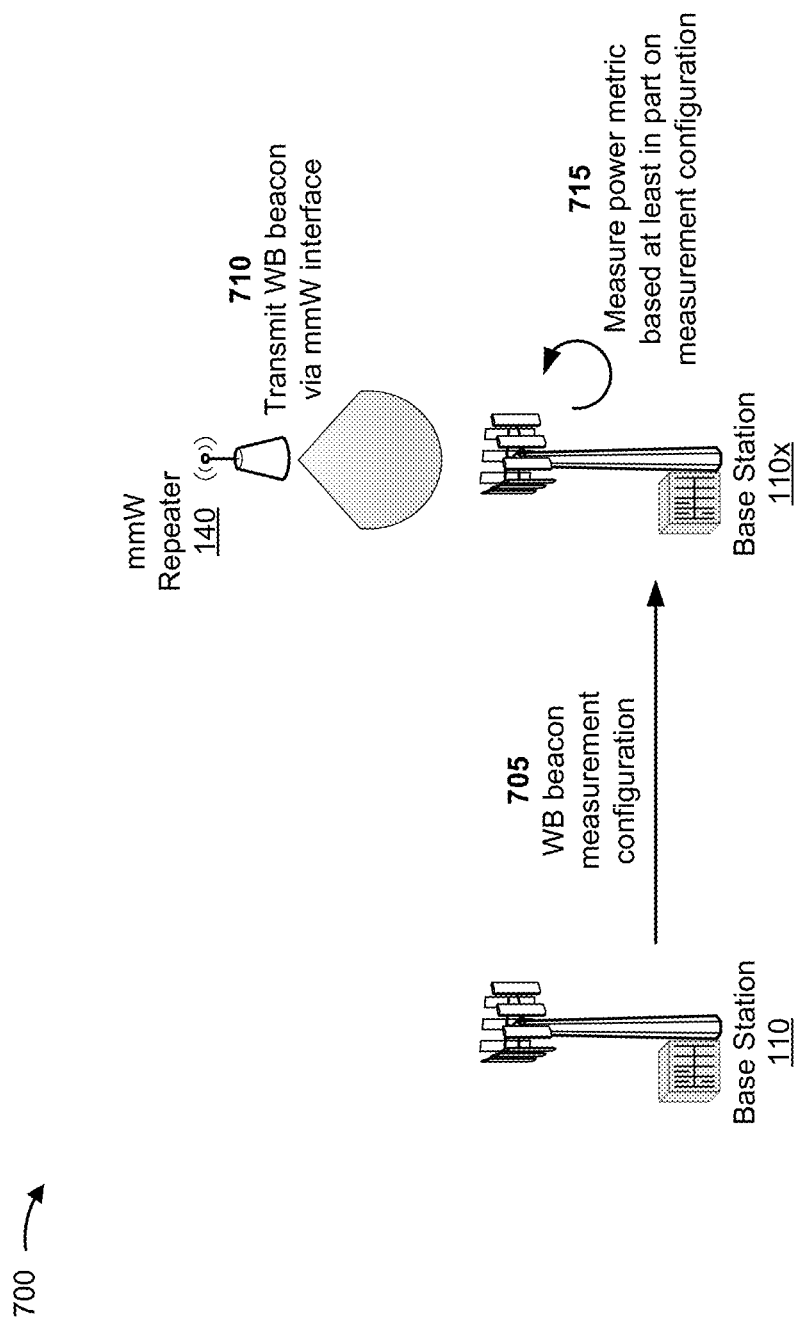

FIG. 7 is a diagram of an example 700 associated with causing another wireless node to measure a wideband signal transmitted by mmW repeater 140.

As shown in FIG. 7, and by reference number 705, base station 110 may provide, to a wireless node, a measurement configuration, associated with measuring a power metric on resources in which mmW repeater 140 is to transmit the wideband signal on the HF interface. The measurement configuration may include, for example, information indicating that the wireless node is to measure a received power in a particular set of time-domain resources (e.g., the time-domain resources in which mmW repeater 140 is to transmit the wideband signal). In some aspects, the wireless node may be another base station 110 (e.g., base station 110x is shown in FIG. 7). In some aspects, the wireless node may be a UE 120. In some aspects, the other wireless node may be another mmW repeater 140.

In some aspects, the measurement configuration may indicate that the wireless node is to measure the wideband signal on a periodic basis. Additionally, or alternatively, the measurement configuration may indicate that the wireless node is to measure the wideband signal on a semi-persistent basis (e.g., in a configured set of time-domain resources). In some aspects, the measurement configuration may be used to dynamically configure the measuring of the wideband signal (e.g., such that the measurement of the wideband signal can be dynamically configured by base station 110).

In some aspects, base station 110 may provide, to the wireless node, a reporting configuration associated with reporting a measurement of the power metric on the resources in which mmW repeater 140 is to transmit the wideband signal on the HF interface. The reporting configuration may include, for example, information indicating that the wireless node is to report the measurement, information that identifies a set of resources in which the wireless node is to report the measurement, and/or the like.

As further shown in FIG. 7, and by reference number 710, mmW repeater 140 may transmit the wideband signal via the HF interface. In some aspects, mmW repeater 140 may transmit the wideband signal in accordance with a configuration received from base station 110, as described above.

As shown by reference number 715, the wireless node (e.g., base station 110x), after receiving the measurement configuration, may measure, based at least in part on the measurement configuration, the power metric on the set of resources associated with the wideband signal transmitted by mmW repeater 140.

In some aspects, the wireless node may determine, based at least in part on a result of measuring the power metric, whether a connection can be established between the wireless node and mmW repeater 140 via the HF interface. Further, in some aspects, the wireless node may identify, based at least in part on a result of measuring the power metric, a beamforming configuration associated with establishing the connection between the wireless node and mmW repeater 140 via the HF interface. In this way, the wireless node may determine whether a connection can be established with mmW repeater 140 via the HF interface and, if so, which TX beam beamforming configuration and/or RX beam beamforming configuration to use for the connection.

In some aspects, the wireless node may communicate with another wireless node based at least in part on a result of measuring the power metric on the set of resources. For example, in some aspects, the wireless node may receive, from base station 110, a reporting configuration, as described above. In such a case, the wireless node may provide, based at least in part on the reporting configuration, a report including information associated with the result of measuring the power metric. In some aspects, the report may be a periodic report based at least in part on the reporting configuration. In some aspects, the report may be dynamically configured based at least in part on the reporting configuration. In some aspects, the report may be event-triggered based at least in part on the reporting configuration (e.g., such that the wireless node provides the report upon the occurrence of an event, such as a received power satisfying a threshold, the expiration of a timer, and/or the like).

In some aspects, base station 110 may receive, from the wireless node, the report including information associated with the result of measuring the power metric on resources in which mmW repeater 140 transmitted the wideband signal on the HF interface. In some aspects, base station 110 may receive reports from multiple wireless nodes (e.g., multiple other base stations 110). In some aspects, based at least in part on the one or more reports, base station 110 may determine an association for mmW repeater 140 (e.g., base station 110 may identify a wireless node with which mmW repeater 140 is to communicate) and a beamforming configuration for the association (e.g., an RX beam beamforming configuration and/or a TX beam beamforming configuration). Thus, in some aspects, base station 110 may determine a communication configuration based at least in part on which the wireless node may communicate with mmW repeater 140.

In some aspects, base station 110 may provide the communication configuration to the wireless node. Here, the wireless node may receive the communication configuration, and may communicate with mmW repeater 140 based at least in part on the communication configuration.

As indicated above, FIG. 7 is provided as an example. Other examples may differ from what is described with respect to FIG. 7.

Figure 8:
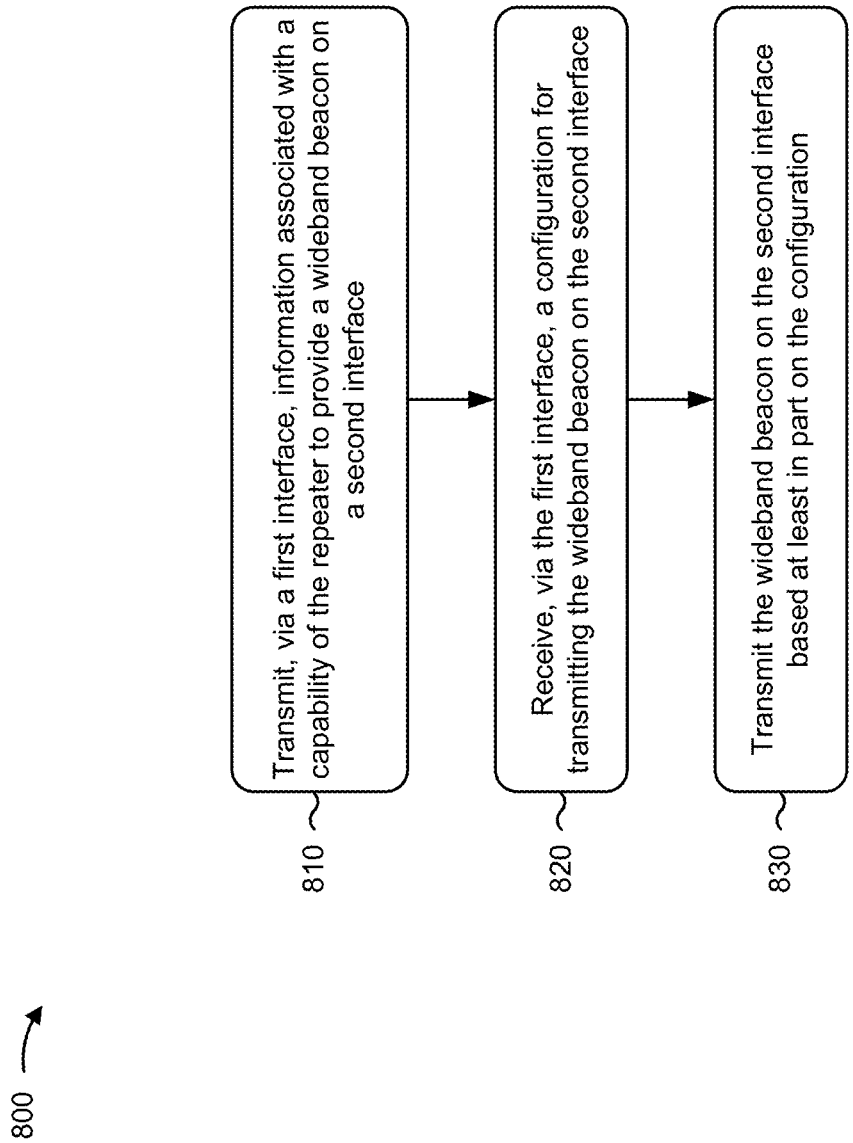
FIGS. 8-10 are diagrams illustrating example processes associated with beam management of a millimeter wave repeater using a wideband signal, in accordance with various aspects of the present disclosure.

FIG. 8 is a diagram illustrating an example process 800 performed, for example, by a repeater, in accordance with various aspects of the present disclosure. Example process 800 is an example where a repeater (e.g., mmW repeater 140) performs operations associated with beam management of the repeater using a wideband signal.

As shown in FIG. 8, in some aspects, process 800 may include transmitting, via a first interface, information associated with a capability of the repeater to provide a wideband signal on a second interface (block 810). For example, the repeater (e.g., using controller 530, communication component 540, and/or the like) may transmit, via a first interface, information associated with a capability of the repeater to provide a wideband signal on a second interface, as described above. In some aspects, the second interface may be different from the first interface. For example, the second interface may be an HF interface and the first interface may be an LF interface, in some aspects. In some aspects, the second interface and the first interface may be different interfaces, but may be the same in terms of frequency. For example, the second interface may be an interface used for relaying a signal and the first interface may be a control interface, where the interface used for relaying the signal and the control interface operate in the same frequency band.

As further shown in FIG. 8, in some aspects, process 800 may include receiving, via the first interface, a configuration for transmitting the wideband signal on the second interface (block 820). For example, the repeater (e.g., using controller 530, communication component 540, and/or the like) may receive, via the first interface, a configuration for transmitting the wideband signal on the second interface, as described above.

As further shown in FIG. 8, in some aspects, process 800 may include transmitting the wideband signal on the second interface based at least in part on the configuration (block 830). For example, the repeater (e.g., using controller 530, oscillator 560, gain component 570, switch 580, antenna 510/510', and/or the like) may transmit the wideband signal on the second interface based at least in part on the configuration, as described above.

Process 800 may include additional aspects, such as any single implementation or any combination of aspects described below and/or in connection with one or more other processes described elsewhere herein.

In a first aspect, the repeater may generate the wideband signal based at least in part on the configuration.

In a second aspect, alone or in combination with the first aspect, the first interface is a low frequency interface and the second interface is a millimeter wave interface.

In a third aspect, alone or in combination with the any one or more of the first and second aspects, the wideband signal is transmitted on a periodic basis based at least in part on the configuration.

In a fourth aspect, alone or in combination with the any one or more of the first through third aspects, the wideband signal is transmitted on a semi-persistent basis in a configured set of time-domain resources based at least in part on the configuration.

In a fifth aspect, alone or in combination with the any one or more of the first through fourth aspects, the transmitting of the wideband signal is dynamically configured based at least in part on the configuration.

In a sixth aspect, alone or in combination with the any one or more of the first through fifth aspects, the transmitting of the wideband signal is event-triggered based at least in part on the configuration.

In a seventh aspect, alone or in combination with the any one or more of the first through sixth aspects, the configuration includes information associated with a transmit beam beamforming configuration associated with transmitting the wideband signal.

In an eighth aspect, alone or in combination with the any one or more of the first through seventh aspects, the configuration includes information associated with a transmit beam power setting associated with transmitting the wideband signal.

In a ninth aspect, alone or in combination with the any one or more of the first through eighth aspects, the configuration includes information that identifies a set of time-domain resources on which the wideband signal is to be transmitted.

In a tenth aspect, alone or in combination with the any one or more of the first through ninth aspects, the repeater may receive a request for the information associated with the capability of the repeater to provide the wideband signal on the second interface, the information associated with the capability of the repeater to provide the wideband signal on the second interface being transmitted in response to the request.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
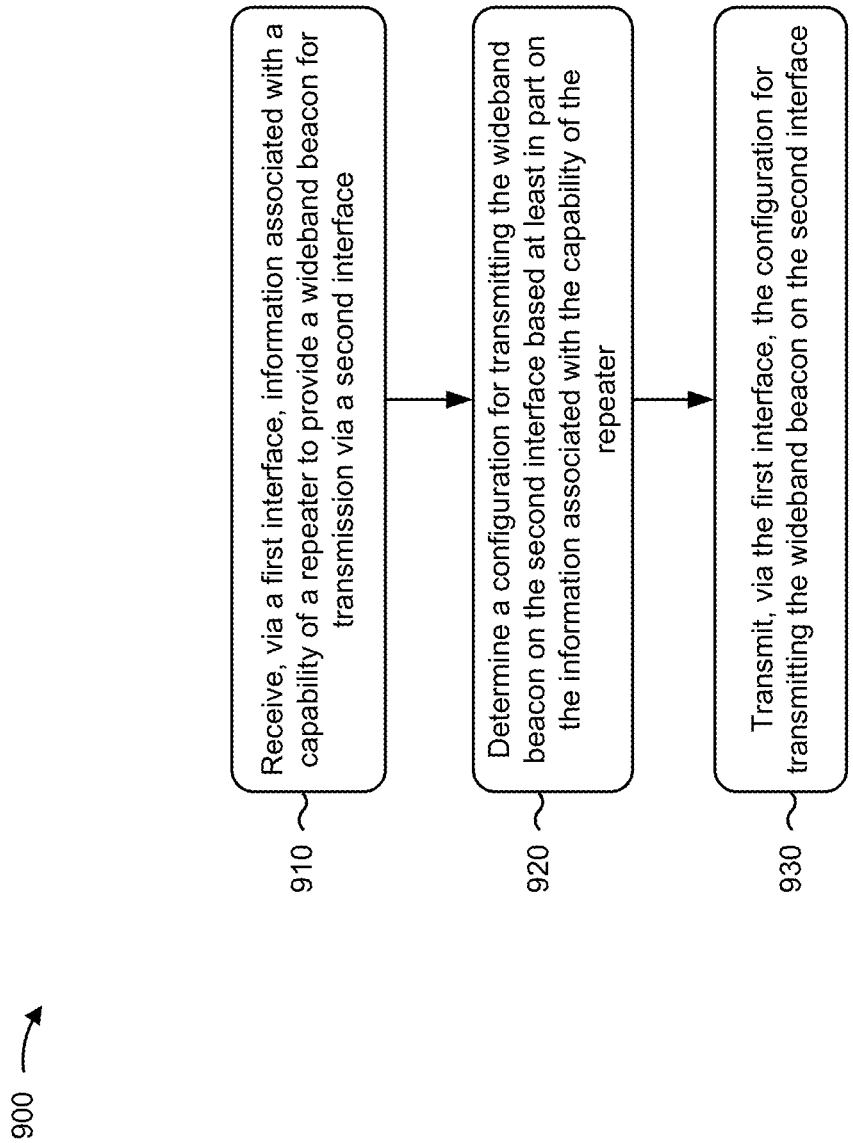

FIG. 9 is a diagram illustrating an example process 900 performed, for example, by a base station, in accordance with various aspects of the present disclosure. Example process 900 is an example where a base station (e.g., base station 110) performs operations associated with beam management of a repeater (e.g., mmW repeater 140) using a wideband signal.

As shown in FIG. 9, in some aspects, process 900 may include receiving, via a first interface, information associated with a capability of a repeater to provide a wideband signal for transmission via a second interface (block 910). For example, the base station (e.g., using antenna 234, receive processor 238, controller/processor 240, and/or the like) may receive, via a first interface, information associated with a capability of a repeater to provide a wideband signal for transmission via a second interface, as described above.

In some aspects, the second interface may be different from the first interface. For example, the second interface may be an HF interface and the first interface may be an LF interface, in some aspects. In some aspects, the second interface and the first interface may be different interfaces, but may be the same in terms of frequency. For example, the second interface may be an interface used for relaying a signal and the first interface may be a control interface, where the interface used for relaying a signal and the control interface operate in the same frequency band.

As further shown in FIG. 9, in some aspects, process 900 may include determining a configuration for transmitting the wideband signal on the second interface based at least in part on the information associated with the capability of the repeater (block 920). For example, the base station (e.g., using controller/processor 240, memory 242, and/or the like) may determine a configuration for transmitting the wideband signal on the second interface based at least in part on the information associated with the capability of the repeater, as described above.

As further shown in FIG. 9, in some aspects, process 900 may include transmitting, via the first interface, the configuration for transmitting the wideband signal on the second interface (block 930). For example, the base station (e.g., using antenna 234, controller/processor 240, memory 242, and/or the like) may transmit, via the first interface, the configuration for transmitting the wideband signal on the second interface, as described above.

Process 900 may include additional aspects, such as any single implementation or any combination of aspects described below and/or in connection with one or more other processes described elsewhere herein.

In a first aspect, the first interface is a low frequency interface and the second interface is a millimeter wave interface.

In a second aspect, alone or in combination with the first aspect, the base station may transmit, to the repeater, a request for the information associated with the capability of the repeater to provide the wideband signal for transmission on the second interface.

In a third aspect, alone or in combination with the any one or more of the first and second aspects, the configuration indicates that the wideband signal is to be transmitted on a periodic basis.

In a fourth aspect, alone or in combination with the any one or more of the first through third aspects, the configuration indicates that the wideband signal is to be transmitted on a semi-persistent basis in a configured set of time-domain resources.

In a fifth aspect, alone or in combination with the any one or more of the first through fourth aspects, a transmission of the wideband signal is dynamically configured based at least in part on the configuration.

In a sixth aspect, alone or in combination with the any one or more of the first through fifth aspects, a transmission of the wideband signal is event-triggered based at least in part on the configuration.

In a seventh aspect, alone or in combination with the any one or more of the first through sixth aspects, the configuration includes information associated with a transmit beam beamforming configuration associated with transmitting the wideband signal.

In an eighth aspect, alone or in combination with the any one or more of the first through seventh aspects, the configuration includes information associated with a transmit beam power setting associated with transmitting the wideband signal.

In a ninth aspect, alone or in combination with the any one or more of the first through eighth aspects, the configuration includes information that identifies a set of time-domain resources on which the wideband signal is to be transmitted.

In a tenth aspect, alone or in combination with the any one or more of the first through ninth aspects, the base station may a power metric on resources in which the repeater transmits the wideband signal on the second interface.

In an eleventh aspect, alone or in combination with the any one or more of the first through tenth aspects, the base station may determine, based at least in part on a result of measuring the power metric, whether a connection can be established between base station and the repeater via the second interface.

In a twelfth aspect, alone or in combination with the any one or more of the first through eleventh aspects, the base station may identify, based at least in part on a result of measuring the power metric, a beamforming configuration associated with establishing a connection between the base station and the repeater via the second interface.

In a thirteenth aspect, alone or in combination with the any one or more of the first through twelfth aspects, the base station may provide, to a wireless node (e.g., another base station 110, another mmW repeater 140, a UE 120), a measurement configuration associated with measuring a power metric on resources in which the repeater is to transmit the wideband signal on the second interface.

In a fourteenth aspect, alone or in combination with the any one or more of the first through thirteenth aspects, the base station may provide, to a wireless node, a reporting configuration associated with reporting a measurement of a power metric on resources in which the repeater is to transmit the wideband signal on the second interface.

In a fifteenth aspect, alone or in combination with the any one or more of the first through fourteenth aspects, the base station may receive, from a wireless node, a report including information associated with a result of measuring a power metric on resources in which the repeater is to transmit the wideband signal on the second interface; and determine an association for the repeater and a beam forming configuration for the association based at least in part on the report.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
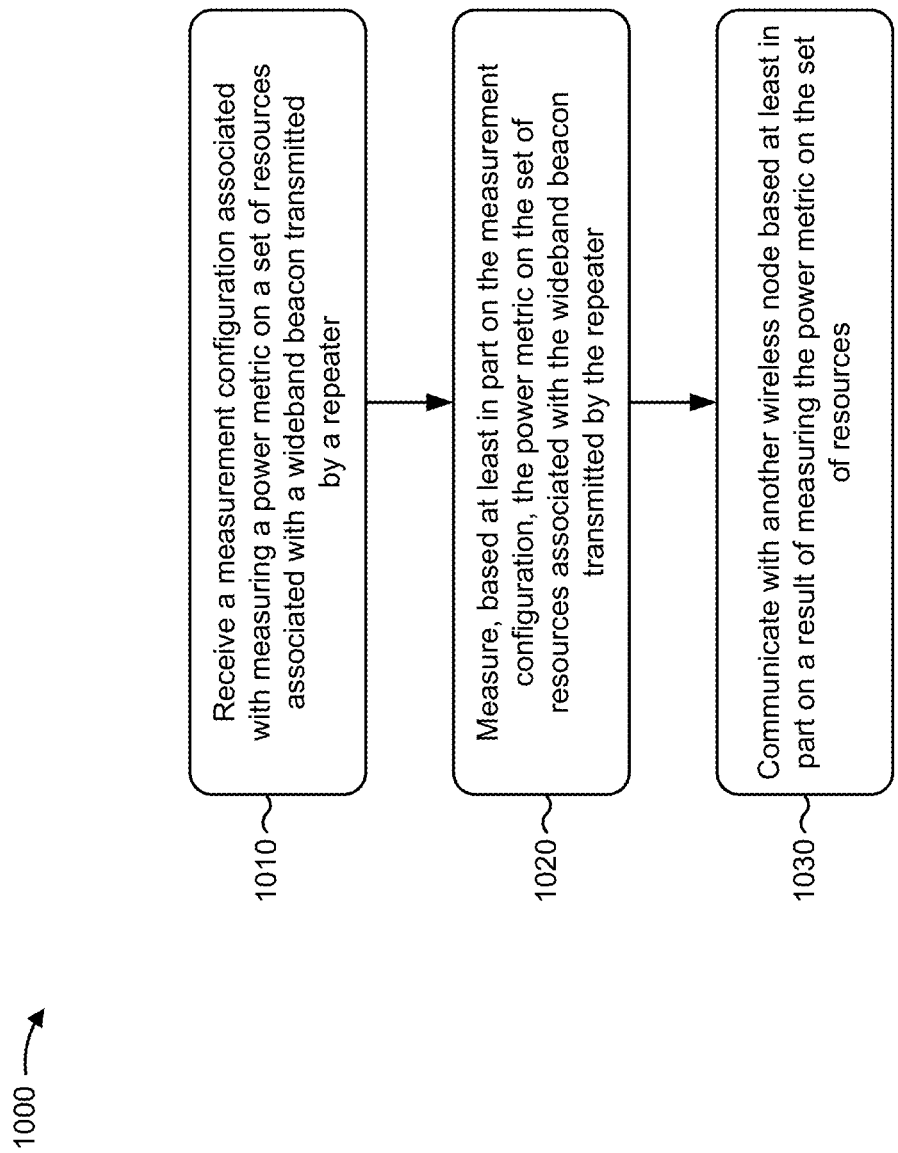

FIG. 10 is a diagram illustrating an example process 1000 performed, for example, by a repeater, in accordance with various aspects of the present disclosure. Example process 1000 is an example where a wireless node (e.g., base station 110, UE 120, mmW repeater 140, and/or the like) performs operations associated with beam management of a repeater (e.g., mmW repeater 140) using a wideband signal.

As shown in FIG. 10, in some aspects, process 1000 may include receiving a measurement configuration associated with measuring a power metric on a set of resources associated with a wideband signal transmitted by a repeater (block 1010). For example, the wireless node (e.g., using an antenna 234, receive processor 238, controller/processor 240 and/or the like when the wireless node is base station 110; using antenna 252, receive processor 258, controller/processor 280, and/or the like when the wireless node is UE 120; using controller 530, communication component 540 and/or the like when the wireless node is mmW repeater 140) may receive a measurement configuration associated with measuring a power metric on a set of resources associated with a wideband signal transmitted by a repeater, as described above.

As further shown in FIG. 10, in some aspects, process 1000 may include measuring, based at least in part on the measurement configuration, the power metric on the set of resources associated with the wideband signal transmitted by the repeater (block 1020). For example, the wireless node (e.g., using an antenna 234, receive processor 238, controller/processor 240 and/or the like when the wireless node is base station 110; using antenna 252, receive processor 258, controller/processor 280, and/or the like when the wireless node is UE 120; using controller 530, communication component 540 and/or the like when the wireless node is mmW repeater 140) may measure, based at least in part on the measurement configuration, the power metric on the set of resources associated with the wideband signal transmitted by the repeater, as described above.

As further shown in FIG. 10, in some aspects, process 1000 may include communicating with another wireless node based at least in part on a result of measuring the power metric on the set of resources (block 1030). For example, the wireless node (e.g., using an antenna 234, receive processor 238, controller/processor 240 and/or the like when the wireless node is base station 110; using antenna 252, receive processor 258, controller/processor 280, and/or the like when the wireless node is UE 120; using controller 530, communication component 540 and/or the like when the wireless node is mmW repeater 140) may communicate with another wireless node (e.g., a UE 120, a base station 110, a mmW repeater 140) based at least in part on a result of measuring the power metric on the set of resources, as described above.

Process 1000 may include additional aspects, such as any single implementation or any combination of aspects described below and/or in connection with one or more other processes described elsewhere herein.

In a first aspect, the measurement is a periodic measurement based at least in part on the measurement configuration.

In a second aspect, alone or in combination with the first aspect, the measurement is a semi-persistent measurement based at least in part on the measurement configuration.

In a third aspect, alone or in combination with the any one or more of the first and second aspects, the measurement is a dynamically configured measurement based at least in part on the measurement configuration.

In a fourth aspect, alone or in combination with the any one or more of the first through third aspects, the wireless node may receive a reporting configuration associated with reporting a result of measuring the power metric; and provide, based at least in part on the reporting configuration, a report including information associated with the result of measuring the power metric.

In a fifth aspect, alone or in combination with the any one or more of the first through fourth aspects, the report is a periodic report based at least in part on the reporting configuration.

In a sixth aspect, alone or in combination with the any one or more of the first through fifth aspects, the report is dynamically configured based at least in part on the reporting configuration.

In a seventh aspect, alone or in combination with the any one or more of the first through sixth aspects, the report is event-triggered based at least in part on the reporting configuration.

In an eighth aspect, alone or in combination with the any one or more of the first through seventh aspects, the wireless node may receive a communication configuration associated with communicating with the repeater; and communicate with the repeater based at least in part on the communication configuration.

In a ninth aspect, alone or in combination with the any one or more of the first through eighth aspects, the wireless node is a user equipment (e.g., UE 120).

In a tenth aspect, alone or in combination with the any one or more of the first through ninth aspects, the wireless node is a UE (e.g., UE 120), a base station (e.g., base station 110), or another repeater (e.g., another mmW repeater 140).

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. An apparatus for wireless communication at a wireless node, comprising:
   a memory; and
   one or more processors, coupled to the memory, configured to cause the wireless node to:
      determine a configuration associated with a wideband signal;
      transmit the configuration to a repeater;
      perform, after transmitting the configuration to the repeater, a measurement of a power metric on one or more resources associated with the wideband signal; and
      communicate based at least in part on the measurement of the power metric on the one or more resources.

2. The apparatus of claim 1, wherein the measurement is:
   a periodic measurement,
   a semi-persistent measurement, or
   a dynamically configured measurement.

3. The apparatus of claim 1, wherein, to communicate, the one or more processors are configured to cause the wireless node to:
   provide a reporting configuration associated with the measurement of the power metric; and
   receive, based at least in part on the reporting configuration, a report including information associated with the measurement of the power metric.

4. The apparatus of claim 3, wherein the report is:
   a periodic report based at least in part on the reporting configuration,
   dynamically configured based at least in part on the reporting configuration, or
   event-triggered based at least in part on the reporting configuration.

5. The apparatus of claim 1, wherein the one or more processors are further configured to cause the wireless node to:
   determine a communication configuration associated with the repeater; and
   provide the communication configuration to another wireless node.

6. The apparatus of claim 1, wherein the wireless node is a network entity.

7. The apparatus of claim 1, wherein the configuration is a configuration for transmitting the wideband signal on a high frequency (HF) interface.

8. The apparatus of claim 1, wherein the one or more resources are a configured set of time-domain resources.

9. The apparatus of claim 1, wherein, to communicate, the one or more processors are configured to cause the wireless node to:
   determine, based at least in part on the measurement of the power metric on the one or more resources, whether a connection can be established between the wireless node and the repeater via a a high frequency (HF) interface.

10. The apparatus of claim 1, wherein, to communicate, the one or more processors are configured to cause the wireless node to:
    identify, based at least in part on the measurement of the power metric on the one or more resources, a beamforming configuration associated with establishing a connection between the wireless node and the repeater via a high frequency (HF) interface.

11. A method of wireless communication performed at a wireless node, comprising:
- determining a configuration associated with a wideband signal;
- transmitting the configuration to a repeater;
- performing, after transmitting the configuration to the repeater, a measurement of a power metric on one or more resources associated with the wideband signal; and
- communicating based at least in part on the measurement of the power metric on the one or more resources.

12. The method of claim 11, wherein the measurement is:
- a periodic measurement,
- a semi-persistent measurement, or
- a dynamically configured measurement.

13. The method of claim 11, wherein the communicating comprises:
- providing a reporting configuration associated with the measurement of the power metric; and
- receiving, based at least in part on the reporting configuration, a report including information associated with the measurement of the power metric.

14. The method of claim 13, wherein the report is:
- a periodic report based at least in part on the reporting configuration,
- dynamically configured based at least in part on the reporting configuration, or
- event-triggered based at least in part on the reporting configuration.

15. The method of claim 11, further comprising:
- determining a communication configuration associated with the repeater; and
- providing the communication configuration to another wireless node.

16. The method of claim 11, wherein the wireless node is a network entity.

17. The method of claim 11, wherein the configuration is a configuration for transmitting the wideband signal on a high frequency (HF) interface.

18. The method of claim 11, wherein the one or more resources are a configured set of time-domain resources.

19. The method of claim 11, wherein the communicating comprises:
- determining, based at least in part on the measurement of the power metric on the one or more resources, whether a connection can be established between the wireless node and the repeater via a high frequency (HF) interface.

20. The method of claim 11, wherein the communicating comprises:
- identifying, based at least in part on the measurement of the power metric on the one or more resources, a beamforming configuration associated with establishing a connection between the wireless node and the repeater via a high frequency (HF) interface.

21. A non-transitory computer-readable medium storing a set of instructions for wireless communication, the set of instructions comprising:
- one or more instructions that, when executed by one or more processors of a wireless node, cause the wireless node to:
  - determine a configuration associated with a wideband signal;
  - transmit the configuration to a repeater;
  - perform, after transmitting the configuration to the repeater, a measurement of a power metric on one or more resources associated with the wideband signal; and
  - communicate based at least in part on the measurement of the power metric on the one or more resources.

22. The non-transitory computer-readable medium of claim 21, wherein the measurement is:
- a periodic measurement,
- a semi-persistent measurement, or
- a dynamically configured measurement.

23. The non-transitory computer-readable medium of claim 21, wherein the one or more instructions to communicate cause the wireless node to:
- provide a reporting configuration associated with the measurement of the power metric; and
- receive, based at least in part on the reporting configuration, a report including information associated with the measurement of the power metric.

24. The non-transitory computer-readable medium of claim 23, wherein the report is:
- a periodic report based at least in part on the reporting configuration,
- dynamically configured based at least in part on the reporting configuration, or
- event-triggered based at least in part on the reporting configuration.

25. The non-transitory computer-readable medium of claim 21, wherein the one or more instructions further cause the wireless node to:
- determine a communication configuration associated with the repeater; and
- provide the communication configuration to another wireless node.

26. An apparatus for wireless communication, comprising:
- means for determining a configuration associated with a wideband signal;
- means for transmitting the configuration to a repeater;
- means for performing, after transmitting the configuration to the repeater, a measurement of a power metric on one or more resources associated with the wideband signal; and
- means for communicating based at least in part on the measurement of the power metric on the one or more resources.

27. The apparatus of claim 26, wherein the measurement is:
- a periodic measurement,
- a semi-persistent measurement, or
- a dynamically configured measurement.

28. The apparatus of claim 26, wherein the means for communicating comprises:
- means for providing a reporting configuration associated with the measurement of the power metric; and
- means for receiving, based at least in part on the reporting configuration, a report including information associated with the measurement of the power metric.

29. The apparatus of claim 18, wherein the report is:
- a periodic report based at least in part on the reporting configuration,
- dynamically configured based at least in part on the reporting configuration, or
- event-triggered based at least in part on the reporting configuration.

30. The apparatus of claim 16, further comprising:
means for determining a communication configuration associated with the repeater; and
means for providing the communication configuration to a wireless node.

\* \* \* \* \*